(12) United States Patent
Rao

(10) Patent No.: US 6,830,815 B2
(45) Date of Patent: Dec. 14, 2004

(54) LOW WEAR AND LOW FRICTION COATINGS FOR ARTICLES MADE OF LOW SOFTENING POINT MATERIALS

(75) Inventor: V. Durga Nageswar Rao, Bloomfield Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/063,238

(22) Filed: Apr. 2, 2002

(65) Prior Publication Data

US 2003/0186060 A1 Oct. 2, 2003

(51) Int. Cl.$^7$ .......................... B32B 27/38; B32B 27/32; C08L 63/00; C10M 105/18
(52) U.S. Cl. .................. 428/413; 428/523; 106/14.05; 106/287.22; 523/440; 523/442; 523/445; 523/454; 523/457; 523/459; 508/110; 525/405
(58) Field of Search ................................ 523/400, 445, 523/468, 454, 457, 458, 442, 459; 508/110, 223; 106/14.05, 287.22; 428/413, 523; 525/405

(56) References Cited

U.S. PATENT DOCUMENTS

| | | |
|---|---|---|
| 4,600,602 A | 7/1986 | Martin et al. |
| 4,628,004 A | 12/1986 | Nickola et al. |
| 4,814,363 A | 3/1989 | Henry |
| 4,874,672 A | 10/1989 | Etter et al. |
| RE34,092 E | 10/1992 | Henry |
| 5,363,821 A | 11/1994 | Rao et al. |
| 5,482,637 A | 1/1996 | Rao et al. |
| 5,554,020 A * | 9/1996 | Rao et al. .................. 418/178 |
| 5,622,785 A | 4/1997 | Gaylor et al. |
| 5,846,349 A | 12/1998 | Rao et al. |
| 5,856,390 A | 1/1999 | Gaylor et al. |
| 5,863,870 A | 1/1999 | Rao et al. |
| 5,942,287 A | 8/1999 | Christiansen et al. |
| 6,133,403 A | 10/2000 | Gerber |
| 6,153,709 A | 11/2000 | Xiao et al. |

OTHER PUBLICATIONS

SAE Technical Paper No. 970009. "Engine Studies of Solid Film Lubricant Coated Pistons", V.D.N. Rao et al, Feb. 24–27, 1997, pp. 69–82.
SAE Technical Paper No. 970022, "Friction and Wear Characteristics of Micro–Arc Oxidation Coating for Light Weight, Wear Resistant, Powertrain Component Application", V.D.N. Rao et al, 1997, pp. 1–15.
SAE Technical Paper No. 970023, "Material Systems for Cylinder Bore Applications—Plasma Spray Technology", V.D.N. Rao et al, Feb. 24–27, 1997, pp. 107–132.

* cited by examiner

*Primary Examiner*—Robert Dawson
*Assistant Examiner*—Michael J. Feely
(74) *Attorney, Agent, or Firm*—Brooks Kushman P.C.; Damian Porcari

(57) ABSTRACT

The present invention relates to an anti-friction and anti-wear liquid coating composition for use with parts made of materials that have softening points below about 300° F. and articles so coated. The present invention also relates to a method of coating parts made from a low softening point materials with an anti-friction and anti-wear hard coating composition. The coating composition comprises a mixture of (i) solid lubricants comprising boron nitride, graphite and molybdenum disulfide, (ii) a thermoset resin system, (iii) catalyst for curing the resin system and (iv) a solvent system comprising highly volatile solvents. The coating composition is applied to the part and cured to form a coating on the part.

19 Claims, No Drawings

LOW WEAR AND LOW FRICTION COATINGS FOR ARTICLES MADE OF LOW SOFTENING POINT MATERIALS

BACKGROUND OF INVENTION

1. Field of the Invention

The present invention relates to surface coatings for surfaces of low softening point materials that reduce the wear and friction of the surface and, more particularly, to anti-friction and anti-wear coatings compositions and methods for coating articles made of low softening point materials, such as high density polyethylene (HDPE), and to coated articles made of low softening point materials.

2. Background Art

The bearing surface of many parts in the automotive and other industries are subject to friction and wear as a result of their bearing surface rubbing against a counter surface. Because of the wear and stress associated with these parts, these parts are typically made of relatively high softening point materials, such as stainless steel and the high temperature polyester Hytrel®, which have softening points above about 450° F. These relatively high softening point materials typically are relatively heavy. Prior art anti-friction and anti-wear coatings have been used with great regularity to coat these parts to help prevent wear and friction to extend the parts lives.

In an effort to reduce the weight and cost of many articles, an effort has been underway to replace parts that typically have been made of relatively high softening point materials with parts made of lighter weight materials such as HDPE. While the aforementioned relatively high softening point materials typically have softening points above about 450° F., the lighter weight materials (HDPE) typically have softening points of less than about 300° F. While many parts that have typically been made of relatively high softening point materials have been replaced over the years with parts made of lower softening point materials, such as HDPE parts, replacing parts made with relatively high softening point materials that are subject to wear and friction at their interfaces with parts made of relatively low softening point (lightweight) materials have not been met with great success. This is because the anti-wear and anti-friction coatings that coat the parts made of relatively high softening point materials typically have curing temperatures above 350° F., well in excess of the softening temperatures of the lighter weight material (HDPE) parts. As such, the anti-friction and anti-wear coatings that have typically been used to coat the higher softening point metals would not be acceptable for coating the lighter weight lower softening point material parts.

Accordingly, it would be desirable to provide an anti-wear and anti-friction coating composition that would be suitable for use with parts made of materials such as HDPE that are relatively lightweight and have relatively low softening points.

SUMMARY OF INVENTION

The present invention relates to an anti-friction and anti-wear coating composition for use with parts made of materials that have softening points below about 300° F. The coating composition comprises a mixture of (i) solid lubricants comprising boron nitride, graphite and molybdenum disulfide, (ii) one or more thermoset resins, (iii) catalyst for curing the resin, and (iv) a solvent system comprising highly volatile solvents.

The present invention also relates to a method of coating high density polyethylene (HDPE) parts and parts made from other low softening point materials with an anti-friction and anti-wear coating composition that comprises a mixture of (i) solid lubricants comprising boron nitride, graphite and molybdenum disulfide, (ii) one or more thermoset resins, (iii) catalyst for curing the resin, and (iv) a solvent system comprising highly volatile solvents.

The present invention also relates to articles made of low softening point materials that are coated with the cured product/coating of the coating composition described herein.

DETAILED DESCRIPTION

The present invention relates to a liquid anti-friction and anti-wear coating composition that can be readily deposited at low temperatures (i.e., from room temperature to about 200° F.) in a thin film that presents a low coefficient of friction, and that is curable to form a coating that has durability at high temperatures (i.e., 400° to 700° F.) and has good load bearing capabilities. The coating composition is relatively low in viscosity and preferably has a viscosity of between about 5 to 75 centipoise at 25° C., more preferably between about 10 and 60 centipoise at 25° C., and most preferably between about 15 to 50 centipoise at 25° C.

The coating composition is comprised of a mixture of solid lubricants comprising boron nitride, graphite and molybdenum disulfide, one or more thermoset resins, catalyst for curing the resin, and a solvent system comprising highly volatile solvents.

Preferably, the solid lubricant mixture is present in the composition in an amount of about 12 to 35 weight percent of the total weight of the composition, more preferably about 15 to 28 weight percent, and most preferably about 20 to 23 weight percent. Preferably, the thermoset resins are present in the composition in an amount of about 15 to 30 weight percent of the total weight of the composition, more preferably about 18 to 26 weight percent, and most preferably about 21 to 24 weight percent. Preferably, the solvent system is present in the composition in an amount of about 35 to 75 weight percent of the total weight of the composition, more preferably about 45 to 65 weight percent, and most preferably about 52 to 58 weight percent.

The solid lubricants should preferably constitute about 30–70% by weight of the cured coating. The graphite should preferably constitute about 25–58% by weight of the solid lubricants, the molybdenum disulfide ($MoS_2$) should preferably constitute about 25–58% of the solid lubricants and the boron nitride (BN) should preferably constitute about 7–16% of the solid lubricants. The solid lubricants can also comprise about 5–20% by weight of LiF, $CaF_2WS_2$, a eutectic of $LiF/CaF_2$ or $LiF/NaF_2$.

Particle sizes of the individual solid lubricant mixture ingredients may be as follows: graphite is introduced into the mixture in the range of about 0.5–45 microns, molybdenum disulfide in the range of about 0.3–45 microns, and boron nitride at about five microns. The mixture is typically ball-milled to produce an average particle size of about 0.3–10 microns.

The mixture provides for a temperature stability up to temperatures as high as about 700° F., load bearing capacities well above about 10 psi, and excellent oil attraction capability. The mixture of graphite, molybdenum disulfide and boron nitride provides a coefficient of friction which is in the range of about 0.07–0.08 at room temperature and a coefficient of friction as low as about 0.03 at about 700° F.

The thermoset resin is an organic material that has been selected to yield high molecular weight polymer and a tendency to flow on stress before being polymerized. The thermoset resin is advantageously an epoxy, such as bisphenol A, because of enhanced oil affinity properties and higher load bearing capabilities (about 6 psi), phenol formaldehyde, urea formaldehyde, melamine formaldehyde, alkyd polyester, or epoxy. Other resins, such as vinyl butyryl, can also be present. Preferably two or more of the above resins are present and more preferably an epoxy resin and a vinyl butyryl resin are present. The carrier for such polymer or resin may be mineral spirits or butyl acetate.

The composition also preferably contains a curing agent present in an amount of 1–5 wt. % of the composition such as dicyanidimide. Tertiary amine catalyst may also be preferably present in an amount of 0.1–0.8 wt. % of the composition. The composition may also contain a dispersing agent present in an amount of 0.3–1.5 wt. % such as 2, 4, 6 tri dimethlamino ethyl phenol.

The solvent system comprises one or more highly volatile solvents such as methyl ethyl ketone, mineral spirits, 2-propoxy ethanol, xylene and diacetone alcohol. Preferably, the solvent system has an evaporation/boiling point below about 165° F. and more preferably below about 150° F. with all of the solvents in the solvent system preferably having an evaporation/boiling point below about 150° F.

A preferred composition (in weight % of the composition) comprises about 5–14% graphite, about 6–17% $MoS_2$, and about 2–5% BN, an epoxy resin in an amount of 16–25%, a vinyl butyral resin present in an amount of about 0.1 –0.4%, a tertiary amine catalyst present in an amount of about 0.1–0.5%, a dicyandiamide cross-linking agent present in an amount of about 1–3%, diacetone alcohol present in an amount of about 4–12%, methyl ethylene ketone present in an amount of about 10–30%, 2-propoxy ethanol present in an amount of about 8–20%, and xylene present in an amount of about 6–18%.

A particularly preferred composition comprises (in weight % of the composition) about 8.1% graphite, about 10.1% $MoS_2$, about 3% BN, about 22.25% epoxy resin, about 0.15% vinyl butyral resin, about 0.3% tertiary amine catalyst, about 1.3% dicyandiamide cross-linking agent, about 8.3% diacetone alcohol, about 20.4% methyl ethylene ketone, about 14.5% 2-propoxy ethanol, and about 11.6% xylene.

An extremely important and new feature of the inventive solid lubricant system herein is a lower coefficient of friction at higher temperatures. With the solid film lubricant herein, coating scuffing does not occur even after long periods of exposure to severe thermal environments. The coefficient of friction for such system at 750° F. is in the range of about 0.02–0.03. In addition, this coating has excellent noise attenuation characteristics.

The coating composition of the present invention is made by mixing the components in any suitable manner. One preferably manner for preparing the coating composition comprises blending all the ingredients in powder form and adding solvents and ball/roller milling.

Another means is to dissolve the resin in the solvents and mill the solids (e.g., the $MoS_2$, etc.) adding to the resin/solvent slurry in a ball or roller mill. The longer the milling time, the more consistent is the formulation. Also it is necessary to prevent the slurry temperature from rising over 100° F.

The coating composition, because of its low viscosity and the use of highly volatile solvents, is curable at low temperatures, i.e., temperatures less than 300° F., and more preferably at about 250° F., at lengths of about 15–45 minutes, and more preferably about 30 minutes. Because the coating composition of the present invention is curable at such low temperatures, the coating composition is useful for coating lightweight materials/plastics, such as HDPE, that have softening points below about 300° F. as measured by suitable test procedures such as ASTM D1525. In addition to HDPE, other suitable materials that have softening points below about 300° F. are also coatable with the coating composition of the present invention. Suitable examples of such materials include polymeric materials such as fluorinated or partially-fluorinated elastomers such a Viton® rubber.

The articles made of these low softening point materials that are coated with the coating composition of the present invention are ideally suited for use as components that continuously or semi-continuously rub against other components such that anti-wear and anti-friction coatings are desired to prevent wear and friction on the contacting components. Examples of such uses include, but not limited to, biomedical applications such as prosthetics where the ball and sockets joints are provided with HDPE cartilage between the socket and ball, elastomeric seals in doors, and lightweight metal components and other low softening point material components for use in automotive and other applications such as plastic inserting door latches.

The low softening point articles that are to be coated with the coating compositions of the present invention can be coated using any suitable manner. Examples of such suitable manners include spraying, brushing, or dip coating. It should be understood that coating compositions of the present invention can be used to coat, in addition to the articles made of low softening point materials, the counterpart (or counterface) articles that the coated articles rub either continuously or semi-continuously against, even if these counterpart articles are made of higher softening point materials such as stainless steel. Additionally, it should be further understood that these counterpart materials could be coated with other anti-friction, anti-wear coating compositions having higher curing temperatures that are known in the art.

The coating composition when cured on the articles to be coated with the coating composition of the present invention comprise films between 10 and 35 microns, with the coatings being on the thinner side such as 10 to 15 microns for articles that are relatively less rigid such as elastomeric door seals.

EXAMPLE

The friction coefficient and wear rate over time of various test substrates (stators) were measured. The substrates were either (i) left uncoated, (ii) coated with a prior art coating composition having a desired curing temperature of about 350–375° F. that have been used to coat engine components for over ten years, or (iii) coated with the coating composition of the present invention having a desired curing temperature of about 250–275° F. The substrates were tested in a reciprocating test rig, using a test rig and procedure similar to that disclosed in SAE Paper No. 97-0022. The reciprocating test rig was set to have a stroke of 2.27 inches, a test speed of 600 revolutions per minute (RPM), and a testing temperature of about 250° F. The slider in each example was a Mo coated steel piston ring. An oil/salt solution (2 wt. % oil, 3 wt. % NaCl) at a rate of 1 ml/hr. was supplied to the substrate undergoing testing. The material of the substrate (stator) and the coating composition and cure conditions, if used, for each example is set forth below in Table 1.

TABLE 1

| Example | Substrate Material | Coating Composition | Friction Coefficient | Initial Wear Rate (microns/hr.) | Steady State Wear Rate (microns/hr.) |
|---|---|---|---|---|---|
| A | Polyester | Coating composition of the present invention[1] | 0.03–0.04 | 5 | 0.5–1.2 |
| B | HDPE | Uncoated | 0.05–0.06 | 12 | 8 |
| C | Aluminum Alloy | Prior art high cure temperature coating composition[2] | 0.05–0.06 | 22 | 16 |
| D | 316 Stainless Steel | Uncoated | 0.5–0.4 | 9 | 7 |
| E | Polyester | Prior art high cure temperature coating composition[3] | 0.04 | — | 0.5–2.0 |

[1]Cured at 250°–275° for 45 minutes.
[2]Cured at 250°–275° F. for 45 minutes.
[3]Cured at 350° F. for 45 minutes.

The coating compositions for examples A and C were cured at 250°–275° F. for about 45 minutes. The coated composition for example E was cured at 350° F. for about 45 minutes. The friction coefficient and wear rate for each example was measured and is shown in Table 1 above. The initial wear rate is the wear rate during the initial run-in time of the test. The run-in time varies depending upon the type of material being used. The steady state wear rate is the wear rate after the test has reached a steady state condition, i.e., when the wear rate stabilizes. Again, the length of time required to reach steady state varies depending on the materials being used.

It is noteworthy that the prior art coating composition when cured at 250° F. shows wear rates on the test material at least ten times that of the wear rate on the test material coated with the coating composition of the present invention when cured at 250°–275° F. Also, the coating composition of the present invention yields very low friction coefficient and wear rates relative to uncoated 316 stainless steel and HDPE. Also, the coating composition of the present invention yields coatings having lower wear rates and friction coefficients than coatings from the prior art coating composition when the prior art coating composition has been cured at its normal curing temperature of 350° F.

While the best mode for carrying out the invention has been described in detail, those familiar with the art to which this invention relates will recognize various alternative designs and embodiments for practicing the invention as defined by the following claims.

The terms "a" or "an" means "one or more" unless the context requires otherwise. Ordinarily, use of the singular or plural of a given type of component implies the respective plural or singular.

What is claimed is:

1. An anti-friction and anti-wear liquid coating composition for use with parts made of materials that have softening points below about 300° F., the coating composition comprising:

a mixture of (i) solid lubricants comprising boron nitride, graphite and molybdenum disulfide, (ii) a resin system, (iii) at lease one catalyst for curing the resin system and (iv) a solvent system comprising highly volatile solvents.

wherein the coating composition further comprises a curing agent, the resin system comprises an epoxy resin and a vinyl butyral resin, and the solvent system comprises diacetone alcohol, merhylethylene ketone, 2-propoxy ethanol present and xylene, and wherein the components of the solvent system are present in amounts to enable the coating composition to cure at temperatures less than 300° F.

2. The coating composition of claim 1 wherein the solid lubricants comprise about 12–35 weight percent of the total weight of the coating composition and the solvent system comprises about 35–75 weight percent of the total weight of the coating composition.

3. The coating composition of claim 2 wherein the solvent system has a boiling point below about 150° F.

4. An anti-friction and anti-wear liquid coating composition for use with parts made of materials that have softening points below about 300° F. the coating composition comprising:

a mixture of (i) solid lubricants comprising boron nitride, graphite and molybdenum disulfide, (ii) a resin system, (iii) at lease one catalyst for curing the resin system and (iv) a solvent system comprising highly volatile solvents.

wherein the coating composition comprises (in weight % of the composition) about 5–14% graphite, about 6–17% MoS, about 2–5% BN, about 16–25% epoxy resin, vinyl butyral resin, present in an amount of about 0.1–0.4%, a tertiary amine catalyst present in an amount of about 0.1–0.5%, a dicyandimide cross-linking agent present in an amount of about 1–3%, diacetone alcohol present in an amount of about 4–12%, methyl ethylene ketone present in an amount of about 10–30%, 2-propoxy ethanol present in an amount of about 8–20%, and xylene present in an amount of about 6–18%.

5. The coating composition of claim 4, wherein the coating composition has a viscosity of between about 5 to 75 centipoise at 25° C. and comprises (in weight % of the composition) about 8.1% graphite, about 10.1% MoS, about 3% BN, about 22.25% epoxy resin, about 0.15% vinyl butyral resin, about 0.3% tertiary amine catalyst, about 1.3% dicyandimide cross-linking agent, about 8.3% diacetone alcohol, about 20.4% methyl ethylene ketone, about 14.5% 2-propoxy ethanol, and about 11.6% xylene.

6. A method of coating parts made of materials that have softening points below about 300° F., the method comprising:

coating at least a portion of the part with an anti-friction and anti-wear hard coating composition that comprises a mixture of (i) solid lubricants comprising boron nitride, graphite and molybdenum disulfide, (ii) a resin system, (iii) at least one catalyst for curing the resin system, and a (iv) solvent system comprising highly volatile solvents; and curing the coating composition to form a coating on the part.

7. The method of claim 6 wherein the solid lubricants comprise about 12–35 weight percent of the total weight of the coating composition and the solvent system comprises about 35–75 weight percent of the total weight of the coating composition.

8. The method of claim 7 wherein the solvent system has a boiling point below about 150° F.

9. The method of claim 8 wherein the solvent system consists of solvents selected from the group consisting of methyl ethyl ketone, 2-propoxy ethanol, xylene and diacetone alcohol.

10. The method of claim 9 wherein the resin comprises an epoxy resin.

11. The method of claim 6 wherein the coating composition further comprises a curing agent and the coating composition comprises (in weight % of the composition) about 5–14% graphite, about 6–17% $MoS_2$, and about 2–5% BN, an epoxy resin in an amount of 16–25%, a vinyl butyral resin, present in an amount of about 0.1–0.4%, a tertiary amine catalyst present in an amount of about 0.1–0.5%, a dicyandimide cross-linking agent present in an amount of about 1–3%, diacetone alcohol present in an amount of about 4–12%, methyl ethylene ketone present in an amount of about 10–30%, 2-propoxy ethanol present in an amount of about 8–20%, and xylene present in an amount of about 6–18%.

12. The method of claim 11 wherein the coating composition comprises (in weight % of the composition) about 8.1% graphite, about 10.1% $MoS_2$, about 3% BN, about 22.25% epoxy resin, about 0.15% vinyl butyral resin, about 0.3% tertiary amine catalyst, about 1.3% dicyandiamide cross-linking agent, about 8.3% diacetone alcohol, about 20.4% methyl ethylene ketone, about 14.5% 2-propoxy ethanol, and about 11.6% xylene.

13. The method of claim 12 wherein the part has a softening point below about 300° F.

14. The method of claim 13 wherein the part comprises HDPE.

15. An article coated with a coating composition comprising a mixture of (i) solid lubricants comprising boron nitride, graphite and molybdenum disulfide, (ii) a resin system, (iii) at lease one catalyst for curing the resin System and (iv) a solvent system comprising highly volatile solvents, wherein the article is made of a material that has a softening point below about 300° F.

16. The article of claim 15 wherein the material is made of a substantial amount of HDPE.

17. The article of claim 15 wherein the article is made of a substantial amount of elastomer.

18. The article of claim 15 wherein the highly volatile solvents have an evaporation/boiling point below about 150° F.

19. The article of claim 15 wherein the coating composition further comprises a curing agent and the coating composition comprises (in weight % of the composition) about 5–14% graphite, about 6–17% $MoS_2$, and about 2–5% BN, an epoxy resin in an amount of 16–25%, a vinyl butyral resin, present in an amount of about 0.1–0.4%, a tertiary amine catalyst present in an amount of about 0.1–0.5%, a dicyandimide cross-linking agent present in an amount of about 1–3%, diacetone alcohol present in an amount of about 4–12%, methyl ethylene ketone present in an amount of about 10–30%, 2-propoxy ethanol present in an amount of about 8–20%, and xylene present in an amount of about 6–18%.

* * * * *